(12) United States Patent
Van Overschelde et al.

(10) Patent No.: US 7,927,200 B2
(45) Date of Patent: Apr. 19, 2011

(54) AGRICULTURAL COMBINE ACTIVE SPREADER HAVING A TRIANGULAR NOSE DIVIDER

(75) Inventors: Daniël M. G. Van Overschelde, Torhout (BE); Luc A. Yde, Bassevelde (BE); Frank R. G. Duquesne, Zwevegem (BE); Yvan C. C. Vandergucht, Lo-Reninge (BE); Wim S. O. Declercq, Curitiba (BR)

(73) Assignee: CNH America LLC, New Holland, PA (US)

( * ) Notice: Subject to any disclaimer, the term of this patent is extended or adjusted under 35 U.S.C. 154(b) by 3 days.

(21) Appl. No.: 12/457,000

(22) Filed: Jun. 25, 2009

(65) Prior Publication Data

US 2009/0325659 A1 Dec. 31, 2009

(30) Foreign Application Priority Data

Jun. 25, 2008 (EP) .................................. 08158965

(51) Int. Cl.
*A01F 12/40* (2006.01)
(52) U.S. Cl. ...................................................... 460/112
(58) Field of Classification Search ................ 460/112, 460/111, 901, 119; 56/503; 239/650, 673, 239/667, 666, 668, 661
See application file for complete search history.

(56) References Cited

U.S. PATENT DOCUMENTS

| | | | | |
|---|---|---|---|---|
| 3,232,627 A | * | 2/1966 | Larson | 239/666 |
| 3,539,113 A | * | 11/1970 | Tyler | 239/673 |
| 5,421,777 A | * | 6/1995 | Strubbe et al. | 460/13 |
| 5,976,011 A | * | 11/1999 | Hartman | 460/111 |
| 6,343,986 B1 | | 2/2002 | Hofer | |
| 6,416,405 B1 | * | 7/2002 | Niermann | 460/79 |
| 6,598,812 B1 | * | 7/2003 | Matousek et al. | 239/682 |
| 6,602,131 B2 | * | 8/2003 | Wolters | 460/111 |
| 6,663,485 B2 | * | 12/2003 | Niermann | 460/79 |
| 6,685,558 B2 | * | 2/2004 | Niermann et al. | 460/111 |
| 6,736,721 B2 | * | 5/2004 | Niermann et al. | 460/112 |
| 6,769,980 B2 | * | 8/2004 | Wolters et al. | 460/112 |
| 6,893,340 B1 | * | 5/2005 | Schmidt et al. | 460/111 |
| 6,939,221 B1 | | 9/2005 | Redekop | |
| 7,086,942 B2 | * | 8/2006 | Niermann et al. | 460/111 |
| 7,223,168 B2 | * | 5/2007 | Anderson et al. | 460/111 |
| 7,281,973 B2 | * | 10/2007 | Anderson et al. | 460/111 |
| 7,281,974 B2 | * | 10/2007 | Anderson et al. | 460/111 |
| 7,390,253 B2 | * | 6/2008 | Farley et al. | 460/111 |
| 7,467,997 B2 | * | 12/2008 | Niermann et al. | 460/111 |
| 7,553,227 B2 | * | 6/2009 | Landuyt | 460/111 |
| 2003/0109293 A1 | | 6/2003 | Wolters | |

FOREIGN PATENT DOCUMENTS

| | | |
|---|---|---|
| EP | 1031273 | 8/2000 |
| EP | 1532858 | 5/2005 |
| EP | 1579755 | 9/2005 |
| EP | 1716736 | 11/2006 |
| GB | 997865 | 7/1965 |

* cited by examiner

*Primary Examiner* — Árpád Fábián-Kovács
(74) *Attorney, Agent, or Firm* — Michael G. Harms; Paul M. Sheldrake

(57) ABSTRACT

An active crop residue spreader for an agricultural combine including two horizontal rotor impellers for guiding and uniformly distributing the crop residue on a field, a triangular nose divider with a pyramidal shape which is wider at the base and an extension near or into the chopper. The spreader further comprises a straw guiding plate provided with specially shaped rakes on each side of the guiding plate.

5 Claims, 5 Drawing Sheets

AGRICULTURAL COMBINE ACTIVE SPREADER HAVING A TRIANGULAR NOSE DIVIDER

CROSS REFERENCE TO RELATED APPLICATIONS

This Patent Application claims priority under 35 U.S.C. §119 to EP 08.158.965.7, filed on Jun. 25, 2008 titled, "Active spreader for an agricultural combine" and having Daniël M. G. Van Overschelde, Luc Alexa Yde, Frank R. G. Duquesne, Yvan C. C. Vandergucht and Wim S. O. Declercq as inventors. The full disclosure of EP 08.158.965.7 is hereby fully incorporated herein by reference.

FIELD OF THE INVENTION

The invention relates to an active spreader for controlled spreading of a flow of straw and other crop residue on a field from which the crop was harvested.

BACKGROUND OF THE INVENTION

Currently, combines typically include crop residue spreader apparatus for disposing of straw and other residue separated from the harvested crop onto the field from which the crop was harvested. In addition, some combines have a chaff spreader for spreading chaff residue separated from the grain by the cleaning apparatus or system onto the field. In many instances it is desirable for the straw, chaff and other residue to be spread as evenly as possible over the width of that section of the field over which the combine has just passed and harvested the crop from, to avoid problems resulting from uneven spreading, such as, but not limited to, difficulty in passage of fall tillage tools through residue clumps or thick areas; difficulty in making even straw bales by a baling machine; uneven residue concentration when mulched in the soil; uneven insulation of the field resulting in uneven field warming and thawing and crop emergence during the following planting season; and increased rodent and insect habitat. In some instances, it is also desirable to have an ability to adjust the spreading to compensate for crop type, varying moisture and weather conditions; such as wind and the like, and also combine header width.

U.S. Pat. No. 7,281,973 describes a spreader with vertical rotary impellers and an adjustable flow distributor operable for discharging a flow of straw and other crop residue in a sideward direction for deposition over a field.

Spreaders are known in which two horizontal rotor impellers expel the straw residue. EP 1 031 273 describes a combine harvester having two projection blowers, wherein the material discharge opening of the chaff cutter is in the same plane as the material intake opening of the projection blowers. The periphery of the projection blowers is—starting from the side boundary of the intake opening—delimited by at least partially peripherally extending casing surfaces which are fixed. The two upright surfaces are combined at the centre of the intake opening to form a divider tip whereof the walls extend uniformly in respect of height.

EP 1 269 822 describes a combine harvester having a chaff collector and means for conveying the collected chaff to two projection blowers which are adjustable in three different positions. In active position A the chaff is hurled centrally between the two adjacent projection blowers, where a wedge-shaped guide element divides the supplied chaff flow over the two projection conveyors.

U.S. Pat. No. 7,331,855 describes a spreader with two rotating impellers. The rear of the chopper has an angled discharge mechanism directing the chopped residue into the inlet of the spreader. The spreader is oriented vertically above and rearward of the chopper. Furthermore, the spreader incorporates air intake holes and air fins above the impellers to keep crop residue moving through the impellers without plugging of discharge material.

Although various crop residue spreaders are known which can propel residue a distance equal to about one half the width of a typical combine header, many suffer from shortcomings, including a tendency to provide uneven crop residue distribution or coverage in the side to side direction over the swath. More particularly, for a horizontal spreader, that is, a spreader utilising one or more rotary impellers or other elements rotatable about a generally vertical axis, or an axis oriented or tilted at a small acute angle to vertical, and configured for directing a flow or flows of crop residue sidewardly, it has been found that the resultant coverage has a tendency to be uneven in the sideward direction, for instance, typically thicker toward the outer regions or sides of the swath, and thinner or less uniform closer to the centre of the swath. Another typical problem is loss of straw and other residue through gaps in the spreader area, for instance in the centre between the two rotary impellers or between the chopper and the spreader. It has also been found that a portion of the crop residue may be engaged by the tip of the impeller blades but not conveyed properly along the impeller housing to the spreader outlet. The effect is that an unwanted pile of crop residue is formed on the field in a swath along the centre axis of the spreader.

Meanwhile, larger combines were built having a higher flow of straw and chaff, while the wider headers they are using (nowadays up to 12 m) have a demand of better spreading, and more intensive crop processing in the combine results in more straw and other residues.

Thus, what is sought is a crop residue flow distributor for the discharge outlet of a horizontal crop residue spreader, having a capability to efficiently distribute or guide portions of a discharged flow of crop residue for achieving a desired pattern of the distributed residue, which can include particularly, more even distribution side to side over a region of an agricultural field from which the crop was harvested, to achieve the advantages, and avoid the shortcomings and problems of the prior art devices, discussed above. More specifically the spreader needs to cope with problems of uncontrolled loss of crop residues through gaps and openings of the spreader.

In another aspect, when the crop residue is slid or dropped on the field using a guiding plate instead of a rotary impeller spreader, the crop residue may not be hindered in any way by the guiding mechanism. Known systems provide guiding fingers along each side of the plate, typically oriented towards the centre of the plate to guide the crop residue as it falls on the field. These systems tend to get congested with crop residue, especially when the harvesting machines is tilted sideways when driving on slopes or hills.

Thus it is an object of the present invention to provide a uniform, controlled and unhindered crop residue on the field when harvesting crop in any field or crop conditions, whether using a rotary spreader or a guiding plate. An important aspect is also to keep the harvesting chopper and spreader as clean as possible, avoiding crop residue build-up.

SUMMARY OF THE INVENTION

According to a preferred aspect of the present invention there is provided an active crop residue spreader for an agricultural combine harvester, comprising a housing mountable to a rear end of the combine harvester in position for receiving crop residue from a threshing mechanism and optionally from a chopper mechanism, said spreader comprising two generally horizontal rotor impellers for guiding and carrying the discharged flow away from the spreader and uniformly distributing the crop residue on a field, wherein said spreader comprises a triangular nose divider for splitting the chopped crop residue between the two rotor impellers, said nose divider having a trunco-pyramidal shape which is wider at its base than at its top. The pyramidal shape of the nose divider preferably has side plates inclined at an angle between 5° and 25° with respect to the plane of the base. The difference in width between the base and top side along a vertical axis may be about 70 mm.

According to a second preferable aspect of the present invention there is provided a spreader wherein the nose divider further comprises an extension towards the chopper mechanism. The extension is preferably within 10 mm distance from the rotor knives of the chopper mechanism. In an alternative embodiment the extension extends within the chopper mechanism.

According to a third aspect the spreader comprises a nose divider extending into the rotor deflectors of the spreader, wherein the rotor deflectors are mounted parallel to said rotor impellers, and the zone between the nose divider and the parallel deflectors has the shape of a trapezium with a bottom side which is wider and larger than the top side.

According to yet a fourth aspect a crop guide arrangement is provided for the rear of a harvesting machine, comprising an inclined plate, which may be mounted above a spreader, for guiding unchopped crop residue onto the field, said plate being provided with at least one rake, thereabove, wherein each rake comprises two or more rake fingers positioned at different heights and under an angle with respect to each other, a lower rake finger being positioned more to the centre of the plate than the finger above. The rake fingers may be positioned in parallel inclined planes and the lowest rake finger closest to the inclined plate is positioned at an acute, upward angle to the plate. In a most preferred aspect the spreader has a rake with fingers at a relative angle difference of 5° to 15° and an angle in respect of the inclined plate of 5°.

The active spreading of the present invention gives an important improvement in spreading width and distribution.

In a further aspect the present invention provides an agricultural harvesting machine comprising a spreader mounted to a body element of the harvesting machine and comprising a gas spring between the spreader and the body element for assisting the adjustment of the spreader position, characterised in that it comprises a gas spring safety system for demounting the spreader from the body element, said gas spring safety system comprising a hinge mounted between the gas spring and the spreader housing, said hinge comprising an abutment surface against which the housing is held in the operative position of the spreader and which is operable to pivot away from the housing when the spreader is lifted up for removal of the spreader from the harvesting machine. The movement of the hinge permits some additional upward movement of the spreader beyond the position wherein the gas spring is fully extended.

BRIEF DESCRIPTION OF THE FIGURES

Preferred embodiments of the invention will now be described in further detail, by way of example, with reference to the accompanying drawings, in which.

DETAILED DESCRIPTION OF THE PREFERRED EMBODIMENTS

Figure 1:
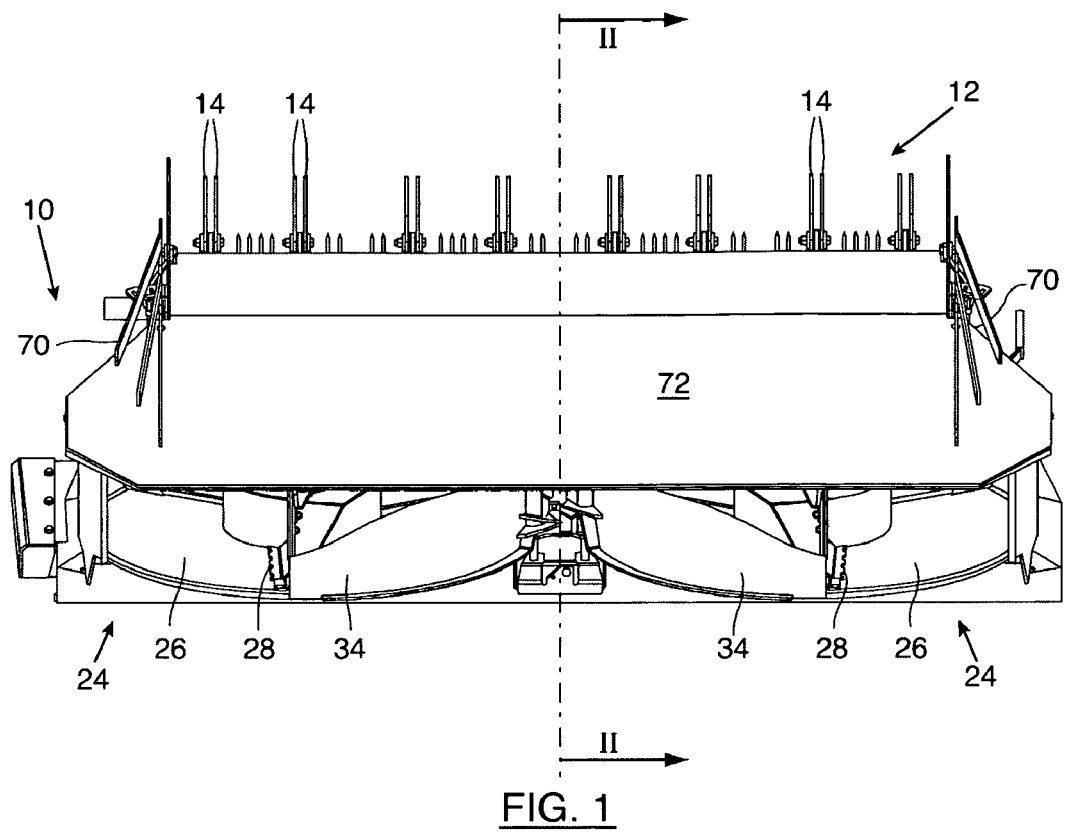
FIG. 1 is a rear view of a combination of a straw chopper and attached spreader for attachment to the straw hood of a combine, showing the chopper and the spreader comprising rotor impellers and a straw guiding plate with rakes.

Straw, stalks, corn cobs and other crop residue and trash that has been separated from the grain of the crops by a threshing mechanism inside an agricultural combine can be spread out on the field by a spreader 10. The straw, stalks and the like are propelled rearwardly by transversal rotating beaters or the like from the threshing mechanism to a horizontal spreader 10 for spreading, and optionally chopping thereby, all in the well known manner. The rotating beater may comprise a straw chopper 12 equipped with ranges of knives 14, which are rotated for chopping the crop residue and propelling it to the entrance of the spreader 10.

The chopper outlet is defined between upper and lower borders 16, 18, which extend the full width of the chopper body. The gap between the chopper outlet upper border and the entrance of the active spreader 10 should be minimal to prevent uncontrolled whirls and consequent loss of residue. A straw guidance plate 20 mounted under an upward angle before the lower border 18 in the bottom of the chopper provides a better capture of the chopped material by the spreader 10.

The active spreading of the present invention gives an important improvement in spreading width and distribution over spreading by stationary guide vanes as used in conventional spreader arrangements behind transverse straw choppers.

Figure 2:
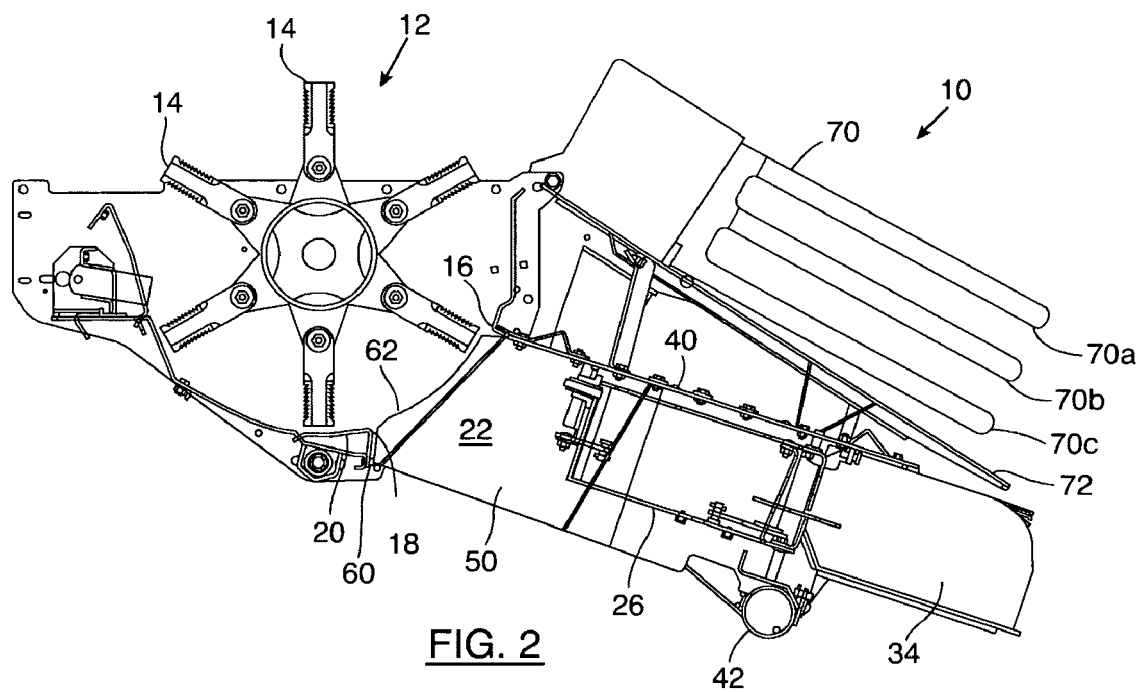
FIG. 2 is a cross sectional view of the chopper and spreader combination taken along line II-II in FIG. 1.

FIGS. 1 and 2 illustrate an active spreader 10 according to the present invention mounted directly behind the trajectory of the knives 14 of the chopper 12, and at an acute, downward angle relative to the outlet direction of the chopped residue. Chopped crop residue is thrown from the chopper knives 14 under an upward angle into the spreader entrance 22. The spreader 10 comprises two contra-rotating generally horizontal rotor impellers 24 for spreading chopped crop residue from the full width straw chopper 12 in a generally sideways direction over the full width of the field strip harvested by the header. The impellers 24 comprise a bottom plate 26, which is provided with a set of, for instance three, impeller blades 28 and mounted for rotation by a suitable motor, such as a hydraulic motor 30. The tips of the impeller blades 28 advantageously are provided with exchangeable wear plates. These engage the residue material from the straw chopper 12 and force it along fixed and movable wall portions 32, 34 of the impeller housing 36. These wall portions are generally parallel to the axis of the impellers 24. Each movable wall portion 34 comprises a deflector plate, which is mounted for pivotment about an upright shaft 38. Its outlet direction may be adjusted manually, e.g. by set screws, or remotely by actuators that may be controlled from the operator's station or via switches on a side panel of the combine harvester. The wall portions 32, 34 are also slideably mounted on the upright shafts 38 for generally vertical movement by another set mechanism or actuator. The inner sections of the wall portions 34 have a greater height than the outer sections, adjacent the wall ends. The upper portion of the residue flow from the impellers 24 first follows the inner high wall sections and then fans out rearwardly and sidewardly over the inclined and curved upper ridge of the wall 34 near the outer tips. The lower portion of the residue flow follows the movable wall portion 34 over its full length and is projected sidewardly from the outer tips. The proportion of material that is fanned out and the proportion that is ejected sidewardly can be adjusted by varying the height of the movable wall portions 34. In this manner it is possible to change the distribution of crop material within the harvested field strip behind the combine harvester.

After installing a new header, the operator has to adjust the various settings of the spreader 10. First, he should vary the rotative speed of the impellers 24 until the spreading width matches the width of the header. Then he may vary the vertical position of the movable wall portions 34 to adjust the distribution of the crop residue on the field. While harvesting, he may adapt the angular position of the movable wall portion 34 for compensating for the effects of side wind or side slope of the field. These conditions may result in part of the material being deposited on the unharvested crop. Moving the wall portion 34 outwardly will direct the material stream away from the crop still to be harvested. Normally there is no need to move both the left and right wall portion 34 simultaneously: it suffices to adjust only the portion next to the standing crop. Where actuators and remote control is being used, the operator may store various positions of the movable wall portion 34 into a memory and recall them for later resetting, e.g., after changing the harvesting direction upon reaching the end of the field. Storing and recalling may be effected through a single compensation rocker switch, whereof the operator may press the left hand side to store or recall a wind/slope compensation position for the left deflector plate and the right hand side to store or recall a wind/slope compensation position for the right deflector plate.

Figure 6:
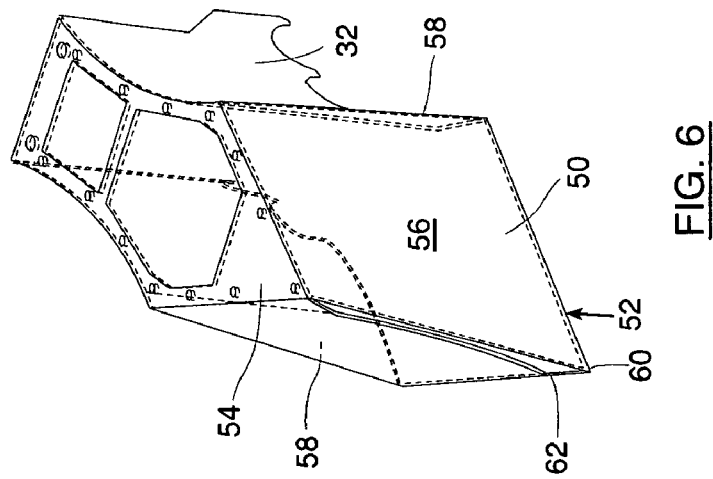
FIGS. 4, 5 and 6 show top, side and perspective views of a trunco-pyramidal nose divider according to the invention.
Figure 4:
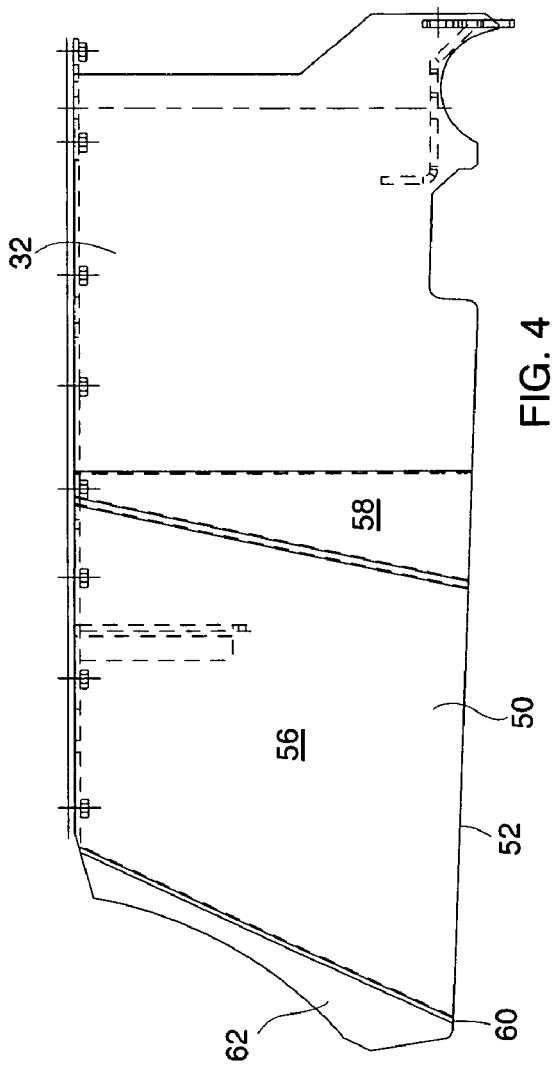
Figure 5:
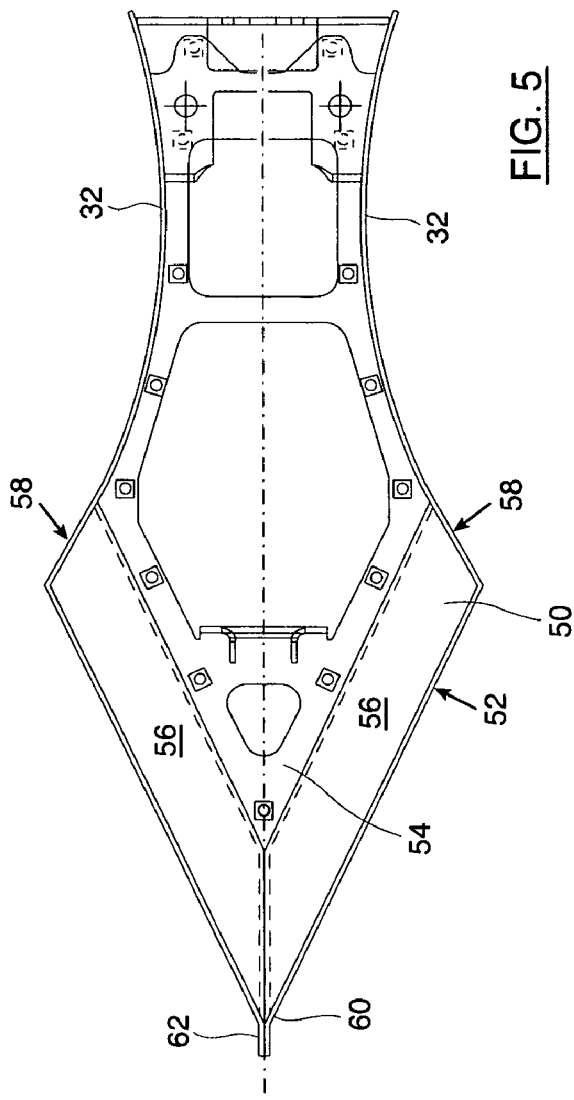

In a first aspect of the present invention the active spreader 10 is provided with a trunco-pyramidally shaped divider or nose splitter 50 as shown in FIGS. 4 to 6. The symmetrical nose splitter 50 divides the chopped crop residue between the two rotor impellers 24 of the spreader. The shape of the nose splitter is such that the nose is wider at its lower, base side 52 than at the top side 54. Hereby the rear end of the lower side 52 of the nose splitter is positioned more forwardly and closer to the rotor impellers 24 than in known systems. The special shape prevents the crop residue that is projected inwardly by the impeller blades 28 from falling down in the space between chopper 12 and the two rotor impellers 24 of the spreader 10. All material coming from the chopper 12 enters the two rotor impellers 24 of the spreader and no material is lost in between on the field or accumulated on adjacent parts, such as the hydraulic parts of the drive system. The distribution of crop residue on the field is enhanced greatly by avoiding such unwanted and uncontrolled heaps of crop residue.

The slope of the nose splitter 50, i.e., the angle of one of its side plates 56 to the plane of the base side 52 may be in the range between 10° and 25°, and is typically about 15°.

Towards the rear of the spreader 10, the nose splitter 50 extends into the fixed wall portions 32, which are mounted parallel with respect to the axes of the rotor impellers 24. The zone 58 between the trunco-pyramidal shape and the parallel shape has a trapezium-like shape, as shown in FIG. 4, whereby the lower side is larger than the upper side. This implies that in that zone of the wall portion the lower side of the deflector is still wider than the top side. This shape enhances the flow of the crop residue in the rotor impellers. The wider shape at the bottom, closer to the bottom plate 26 of the impeller 24, catches the slowest and lowest crop residue preventing it from falling off, while the impeller blades 28 speed up the crop residue at an earlier instant. The upper shape of the deflector, being further away from the rotor and smaller in size, causes minimal hindrance to the upper faster crop residue flow.

Towards the front of the spreader 10, adjacent the straw chopper 12, the base side 52 of the nose splitter 50 has a lower tip 60, which extends more forwardly than the upper tip, at the top side 54. This enables reduction of the distance between the chopper 12 and the spreader 10 without interference of the rotating chopper knives 14 and the nose splitter 50.

A second aspect, as shown in FIGS. 2 and 4, provides the active spreader with an extended crop splitter 62 reaching as close as possible to the trajectory of the central chopper knives 14 or even in between the knives. The material flow from the chopper has to be split in the middle before arriving in the two spreader rotor impellers 24 of the active spreader 10. In known systems (divider tip of EP 1 031 273 and wedge-shaped guide element of EP 1 269 822) the central jet of crop residue flow from the chopper 12 starts to build up against the splitter or drops dead thereagainst and creates crop loss. A skew splitter can avoid the build-up but spills too much material on the field.

According to one embodiment of the present invention the nose splitter 50 is extended and shaped so that it is within 10 mm distance from the rotor knives. FIG. 4 shows a specific shape of the extension 62 on the crop or nose splitter 50, adapted to the trajectory of the chopper knives 14. In this way the shear distance between the rotor knives and the splitter does not give build-up of crop residue a chance. The rotating knives 14 permanently remove any trailing straws from the extension 62. The extension may be a single sheet of metal, or a triangular-like construction.

In another embodiment (not shown), the splitter extension 62 starts from inbetween the rotor knives 14. As such the active spreader splitter extends into the chopper housing. The shape of the splitter can be any shape as long as it does not hinder the rotor knives 14 and allows efficient splitting of the crop residue within the housing of the chopper. In yet another embodiment the splitter extension is provided with a cutting edge and extends towards the centre of the chopper housing, hereby also allowing split chopping.

In a third aspect the active spreader 10 of the present invention is provided with a specially shaped rake 70 for swathing as shown in FIGS. 1 and 2. In this mode of operation the chopper 12 is bypassed and a movable swath plate inside the combine harvester (not shown) passes the crop residue on to an inclined straw guiding plate 72 above the top plate 40 covering the rotary impellers of the spreader. When baling straw it is preferred that the straw is deposited on the field in narrow bands. For this purpose, but also for the purpose of effective swathing without blockage of crop residue, e.g. when wet, in the rake itself, the rake of the present invention is provided.

Figure 3:
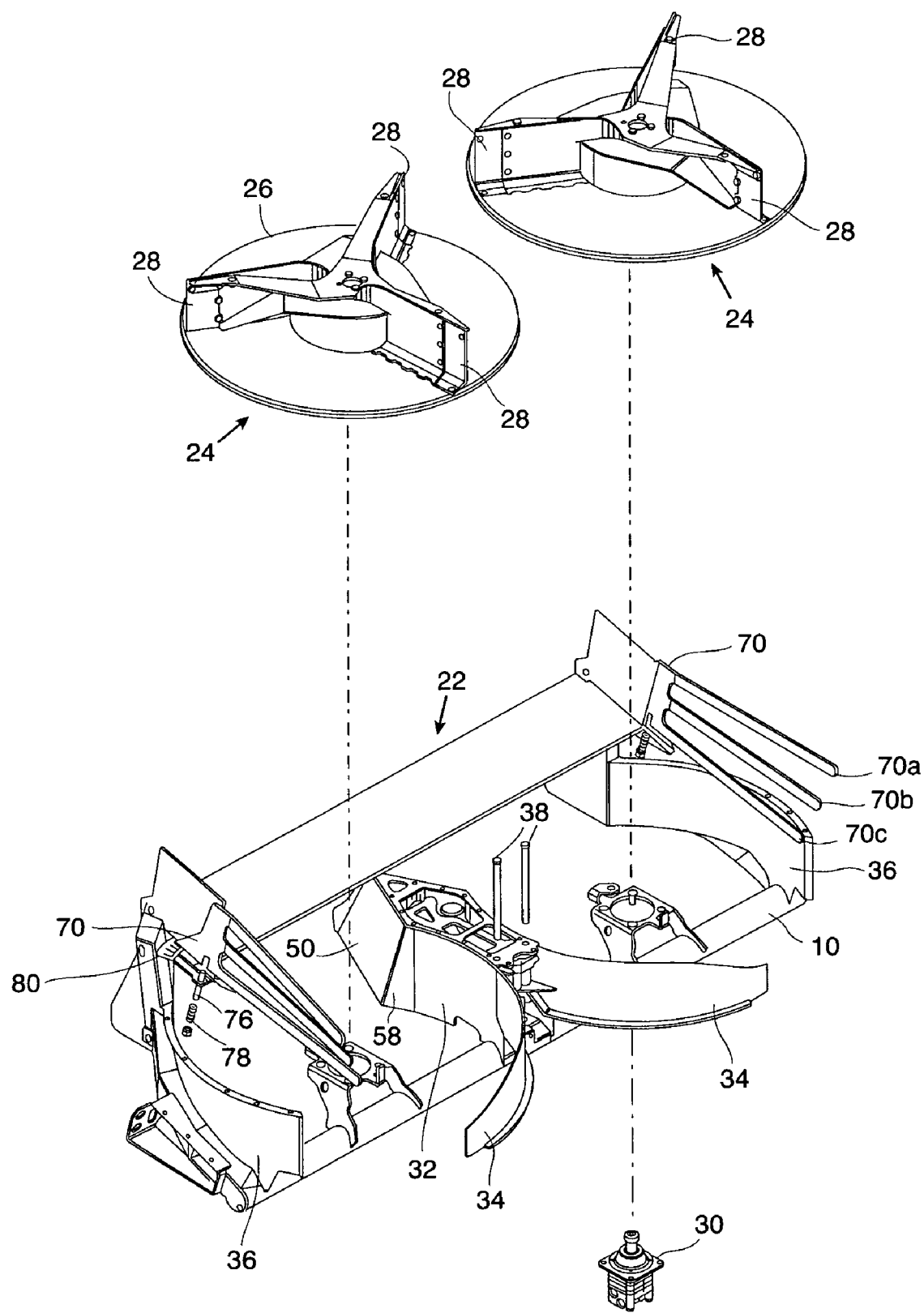
FIG. 3 is an exploded view of the spreader of FIG. 1 after removal of the straw guiding plate and the spreader top plate.

Rakes 70 are mounted on each side of the plate 72 to guide the crop residue. Each finger 70*a-c* of the rake can have a shape as shown in FIGS. 1 to 3, or any other suitable shape, e.g. a metal rod. In one embodiment three rake fingers 70*a-c* are mounted per rake. FIGS. 1 and 2 illustrate the specific vertical and horizontal positions of the rake fingers 70*a-c* with respect of each other. The rake fingers are positioned under a small upward angle to the plate 72. A preferred angle is about 5°. The extra space towards the lower rear side of the plate avoids blockage of crop residue underneath the lower finger 70*c* as the residue slides down the guiding plate 72. For ease of manufacturing, the rake 70*a-c* fingers are preferably parallel in horizontal direction. In vertical direction the rake fingers 70*a-c* are not positioned in one plane, but form an angle whereby the upper rake finger 70*a* is positioned most outwardly and the lower finger 70*c* is positioned more inwardly to the centre of the plate. This setup guarantees that the upper rake finger 70*a* slows down the crop residue less than the lower fingers 70*b* and 70*c*. In a specific embodiment the rake fingers are angled at 5° to 15°. This arrangement guarantees that no crop becomes caught between the diverging fingers while sliding down the guiding plate 72.

The rakes 70 preferably are mounted for angular adjustment about an upright axis, perpendicular to the straw guiding plate 72.

A simple, though convenient solution implies the use of a shaft 76 that is welded or otherwise connected to the front of the rake 70 and loaded downwardly by a spring 78. This spring holds the front lower edge of the rake in a notched element 80 above the guiding plate 72. This configuration allows manual adjustment without requiring further tools.

Another aspect is concerned with the mounting/demounting of the spreader 10 onto/from the combine, especially since the spreader is connected to the chopper 12 by means of a gas spring 82 on one side of the combine to control the spreader adjustments. The gas spring 82 assists the operator in lifting the spreader 10 from a lower operative position into a higher transport position for extra ground clearance during road travel. A gas spring contains gas under high pressures and its body must not be damaged by uncontrolled pull forces.

The spreader 10 is hingeably mounted to the top rear end of the chopper body 86 by a pair of bolts 44 on both sides of the harvester. The impeller housing 36 can be lifted by a pair of arms 88 having a rear end pivotably connected by a pin 100 to the housing 36, and a front end pivotably connected by a pin 98 to a pair of cranks 90. On both sides of the chopper body 86 these cranks are secured onto a transverse pivot shaft (not shown) extending the full width of this body 86. The operator can use a handle (not shown) connected to the shaft or to one of the cranks 90 to pivot the cranks 90 and force the arms 88 rearwardly to rotate the spreader 10 upwardly about the bolts 44. Part of the weight of the spreader 10 is assumed by the gas spring 82, which has a front end connected to the chopper body 86 and a rear end extending substantially horizontally to the spreader 10. The gas spring 82 pushes the spreader 10 rearwardly and upwardly.

According to a preferred embodiment of the present invention a gas spring safety system is provided comprising a hinge system 84 including a hinge 92 mounted to the pivot pin 100 between of one of the arms 88 and the impeller housing 36. The hinge 92 has a rear abutment surface below and rearward of the pin 100, against which surface the impeller housing 36 is resting, and a second pivot connection 96 for the rear end of the gas spring 82, also below and rearward of the pin 100.

As such, according to a preferred embodiment of the invention, the hinge system 84 provides extra play for the spreader-gas spring connection, which avoids overload of and damage to the gas spring 82 when demounting and mounting the spreader onto the combine.

Figure 7:
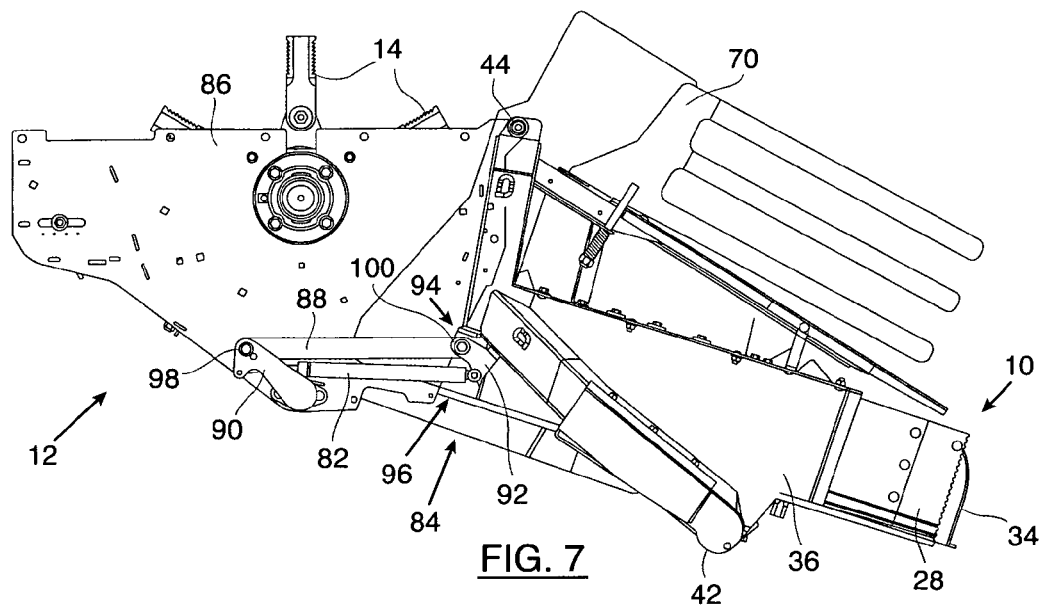
FIG. 7 is a side view of the chopper and spreader combination of FIG. 1, showing a gas spring between the spreader and the chopper, the spreader and gas spring being in normal operation mode (spreader inclined downwardly and rearwardly)
Figure 8:
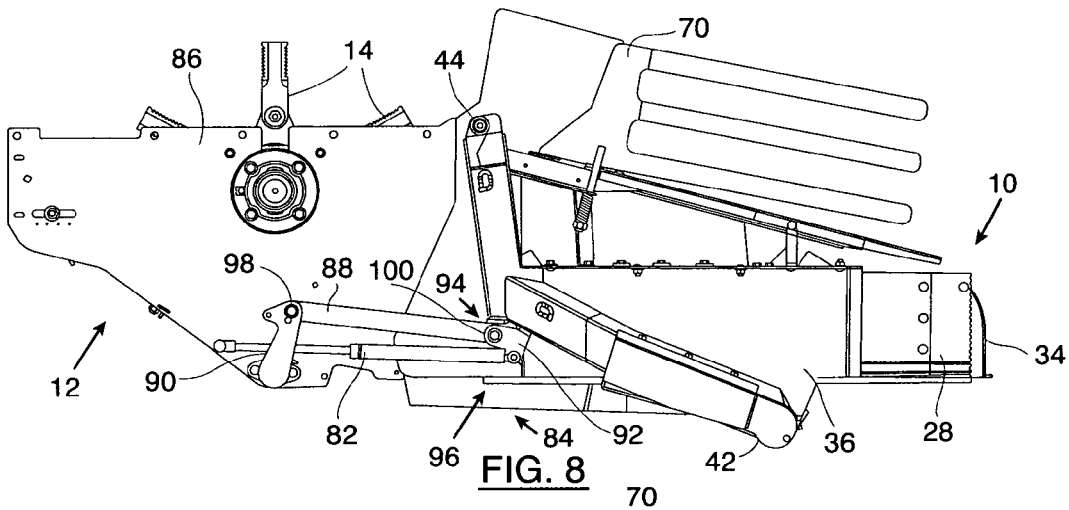
FIG. 8 is a similar side view showing the spreader in intermediate demounting mode (spreader in horizontal position)

FIG. 7 shows the spreader 10 in normal operation mode. The gas spring 82 is under tension and loads the hinge 92 against the impeller housing 36.

Figure 9:
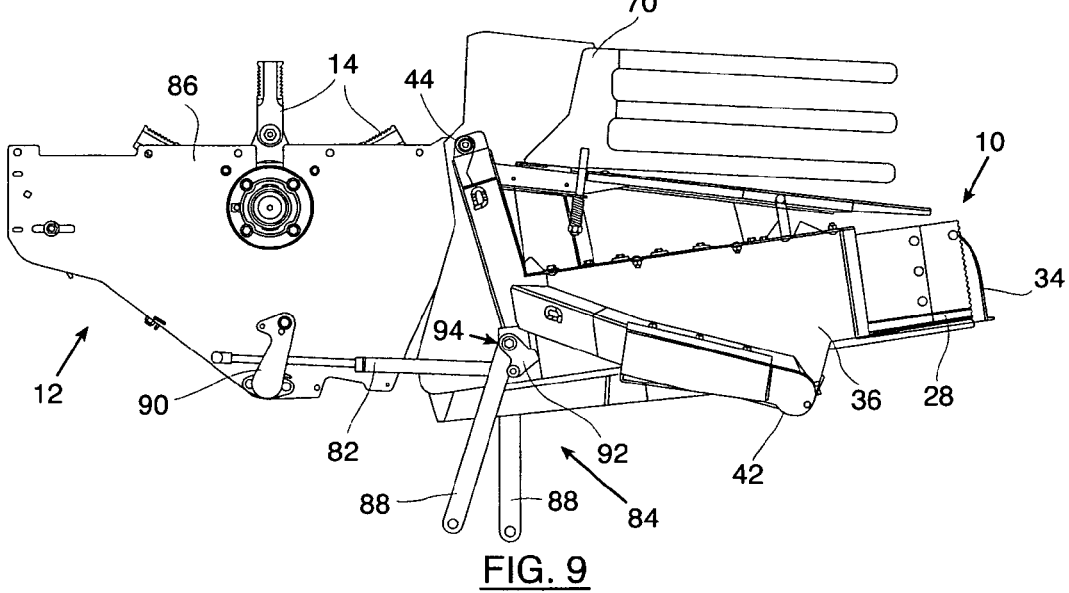
FIG. 9 is a further side view showing the spreader in full demounting mode (spreader uplifted)
Figure 10:
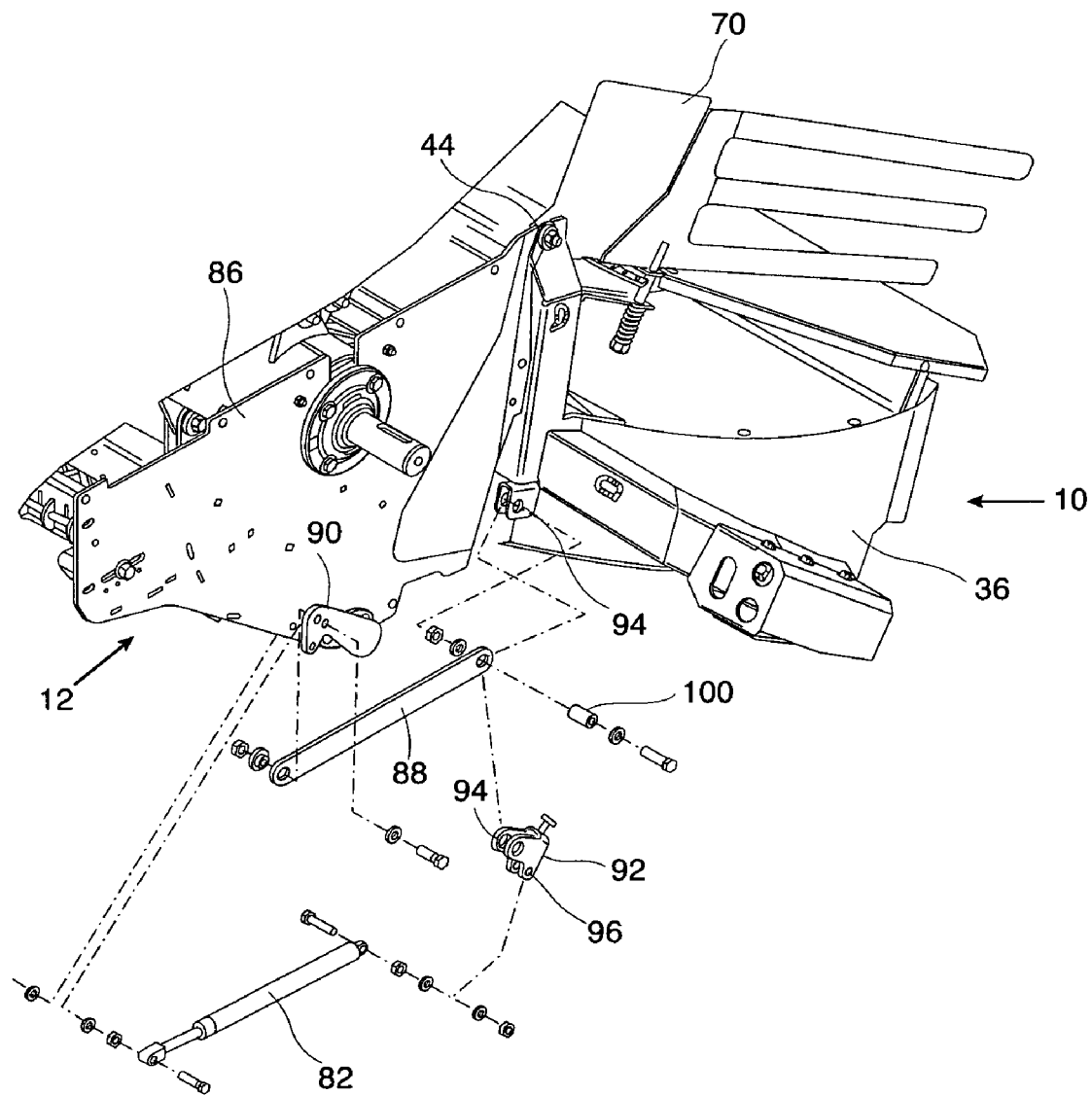
FIG. 10 is an exploded view of the gas spring assembly.

To disassemble the spreader 10 from the combine harvester the operator will first rotate the handle to lift the spreader 10 away from the chopper 12 and lock it into an upper transport position. In this position the gas spring 82 is almost fully extended. An appropriate lifting device, such as a fork lift truck or a hoist with a lift tool, can now be installed just below, e.g. at a few centimeters from, a lower beam 42 of the impeller housing 36. The operator then releases the handle and allows the spreader 10 to come to rest on the lifting device. As this device is supporting the spreader 10, the arms 88 between the spreader 10 and the chopper 12 are not loaded anymore. They can readily be disconnected from the impeller housing 36 by removing the front pins 98, as shown in FIG. 9. The spreader 10 is still attached by the bolts 44 to the chopper body 86. The lifting device can now rotate the housing 36 a little further upwardly, e.g., by 5 cms, such that the rear surface of the hinge 92 no longer rests against the impeller housing 36. The gas spring 82 is now fully extended and may start pulling the hinge 92 rearwardly. Meanwhile, the rotation of the hinge 92 prevents that any further movement of the spreader 10 applies a pull force onto the rear end of the gas spring. This avoids fatal damage to the body of the gas spring 82, even when the spreader is lifted above the position shown in FIG. 9. As there is no further load on the rear pin 100, this one can now be safely removed to release the gas spring 82 from the spreader 10. The impeller housing 36 is then shored up on the lifting device, such that the operator can remove the bolts 44 for completely demounting the spreader 10 from the combine harvester. Now the spreader 10 can be removed safely because no loaded components are present anymore between the chopper body 86 and the impeller housing 36.

Reassembling the spreader 10 onto the chopper 12 requires the same handling operations but in the opposite order.

It will be understood that changes in the details which have been described and illustrated to explain the nature of the invention will occur to and may be made by those skilled in the art upon a reading of this disclosure within the principles and scope of the invention.

The invention claimed is:

1. An active crop residue spreader for an agricultural combine harvester, comprising a housing mountable to a rear end of the combine harvester in position for receiving crop residue from at least one of a threshing mechanism and a chopper mechanism, said spreader comprising two generally horizontal rotor impellers for guiding and carrying the discharged flow away from the spreader and, uniformly distributing the crop residue on a field, said spreader comprising a triangular nose divider for splitting the chopped crop residue between the two rotor impellers wherein said nose divider has a trunco-pyramidal shape such that a nose portion is wider at its base side than at a top side, wherein the nose divider extends into dual fixed wail portions which are mounted parallel with respect to the axis of the rotor impellers, wherein a transition zone is disposed between the trunco-pyramidal nose divider and at least one fixed wall portion, further wherein the transition zone has the shape of a trapezium having a bottom side which is wider and larger than the to side.

2. The spreader according to claim 1 wherein the nose portion has side plates inclined at an angle between 5° and 25° with respect to the plane of the base.

3. The spreader according to claim 1 wherein the spreader is mounted to the chopper mechanism and the nose divider further includes an extension towards said chopper mechanism.

4. The spreader according to claim 3 wherein said extension has a front ridge within 10 mm distance from the trajectory of the rotor knives of the chopper mechanism.

5. The spreader according to claim 3 wherein said extension extends within the chopper mechanism.

* * * * *